United States Patent [19]

Broslaw

[11] Patent Number: 4,605,683

[45] Date of Patent: Aug. 12, 1986

[54] POLYMERIC BUNS AND METHOD AND APPARATUS FOR ITS MANUFACTURE

[75] Inventor: Edwin Broslaw, Hackensack, N.J.

[73] Assignee: Crest-Foam Corporation, Moonachie, N.J.

[21] Appl. No.: 637,907

[22] Filed: Aug. 6, 1984

[51] Int. Cl.⁴ .................. C08G 18/14; B29C 39/16; B29C 39/42; B29C 67/22

[52] U.S. Cl. ........................... 521/99; 264/39; 264/51; 264/54; 264/298; 264/338; 264/DIG. 84; 425/89; 425/224; 425/817 C

[58] Field of Search ............... 264/DIG. 84, 298, 51, 264/48, 39, 338, 54; 425/89, 224, 817 C; 521/99

[56] References Cited

U.S. PATENT DOCUMENTS

| | | | |
|---|---|---|---|
| 2,042,536 | 6/1936 | Leguillon | 264/39 X |
| 2,086,616 | 7/1937 | Hansen et al. | 264/39 X |
| 3,013,924 | 12/1961 | Taft, Jr. et al. | 264/298 X |
| 3,091,811 | 6/1963 | Hackert | 264/48 X |
| 3,123,856 | 3/1964 | Dye et al. | 264/DIG. 84 |
| 3,249,486 | 5/1966 | Voisinet et al. | 264/DIG. 84 |
| 3,288,584 | 11/1966 | Long | 65/22 |
| 3,551,244 | 12/1970 | Forester et al. | 264/298 X |
| 3,555,131 | 1/1971 | Weismann | 264/54 X |
| 3,679,784 | 7/1972 | Rosenberg | 264/298 X |
| 3,734,668 | 5/1973 | Porter | 264/DIG. 84 |
| 3,751,197 | 8/1973 | Petzetaris | 264/DIG. 84 |
| 3,809,512 | 5/1974 | Blackwell et al. | 264/DIG. 84 |
| 3,875,276 | 4/1975 | Haga et al. | 264/DIG. 84 |
| 4,069,285 | 1/1978 | Morgan | 264/DIG. 84 |
| 4,078,293 | 3/1978 | Aine | 264/298 X |
| 4,128,611 | 12/1978 | Kolakowski et al. | 264/DIG. 84 |
| 4,143,106 | 3/1979 | Coyne | 264/51 |
| 4,177,028 | 12/1979 | Dillard | 264/DIG. 84 |
| 4,252,512 | 2/1981 | Kornylak | 425/817 C |

FOREIGN PATENT DOCUMENTS

| | | | |
|---|---|---|---|
| 43-6551 | 3/1968 | Japan | 264/DIG. 84 |
| 47-8946 | 3/1972 | Japan | 264/DIG. 84 |
| 809180 | 2/1959 | United Kingdom | 264/298 |
| 1260287 | 1/1972 | United Kingdom | 264/DIG. 84 |

Primary Examiner—Philip Anderson
Attorney, Agent, or Firm—Darby & Darby

[57] ABSTRACT

A support surface is formed into a trough, a liquid polymer which expands on reaction is dispensed onto the support surface, and the support surface is inclined to cause flow of the polymer to a region in which the polymer expands. The polymer is introduced onto a supporting liquid which supports the polymer in a zone which is substantially coextensive with at least a major portion of the expansion region. The supporting liquid has a specific gravity higher than that of the polymer, whereby the polymer floats on and advances across the supporting liquid in the form of an expanding mass having left and right sides, a flat bottom and a top which slopes upwardly in the direction of the advance. Conveyors support the expanding mass at the respective left and right sides thereof. The conveyors are submerged in the liquid at their upstream ends, and the direction of advance of their polymer-supporting active surfaces is substantially parallel to the sloping top of the polymeric bun as it expands.

39 Claims, 14 Drawing Figures

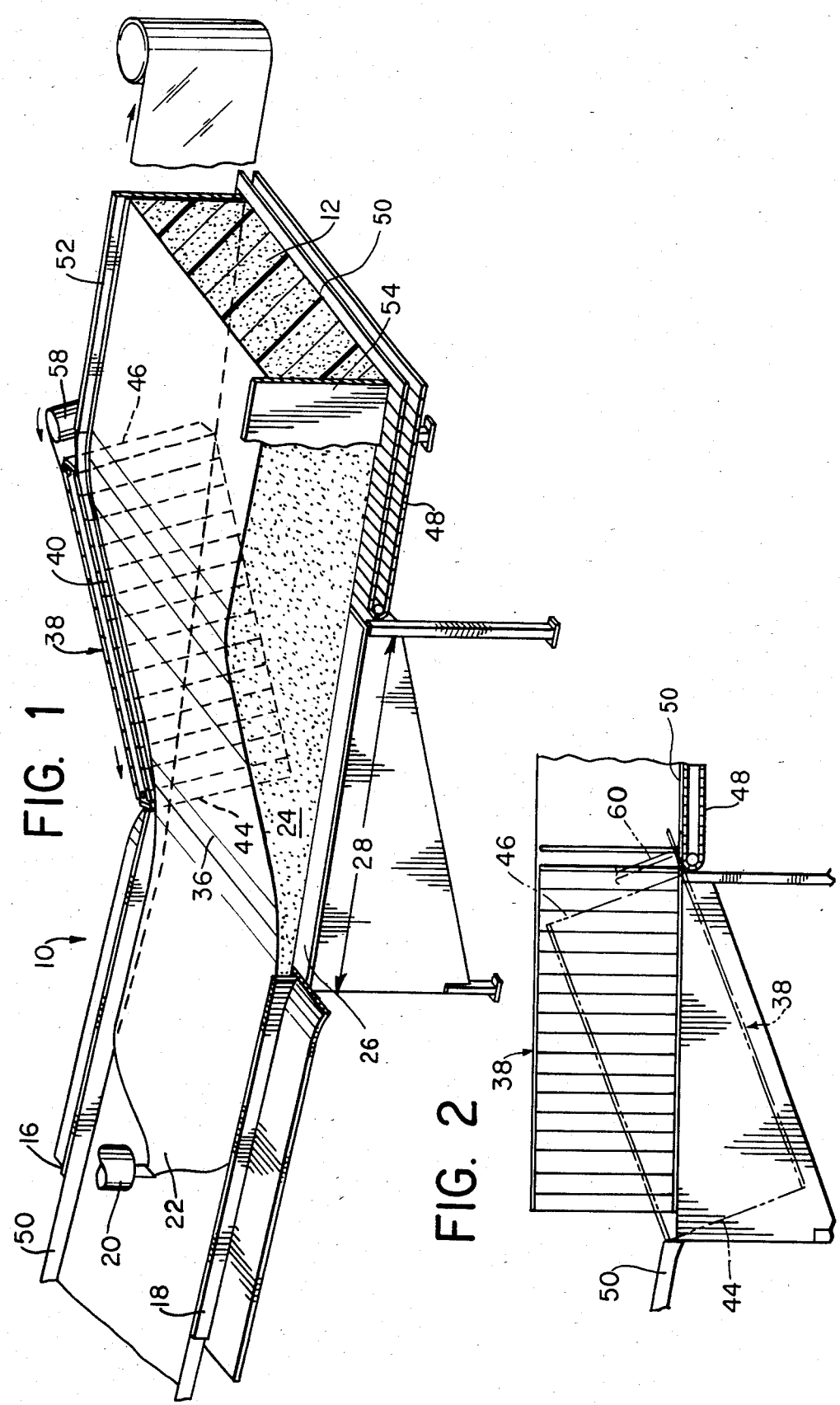

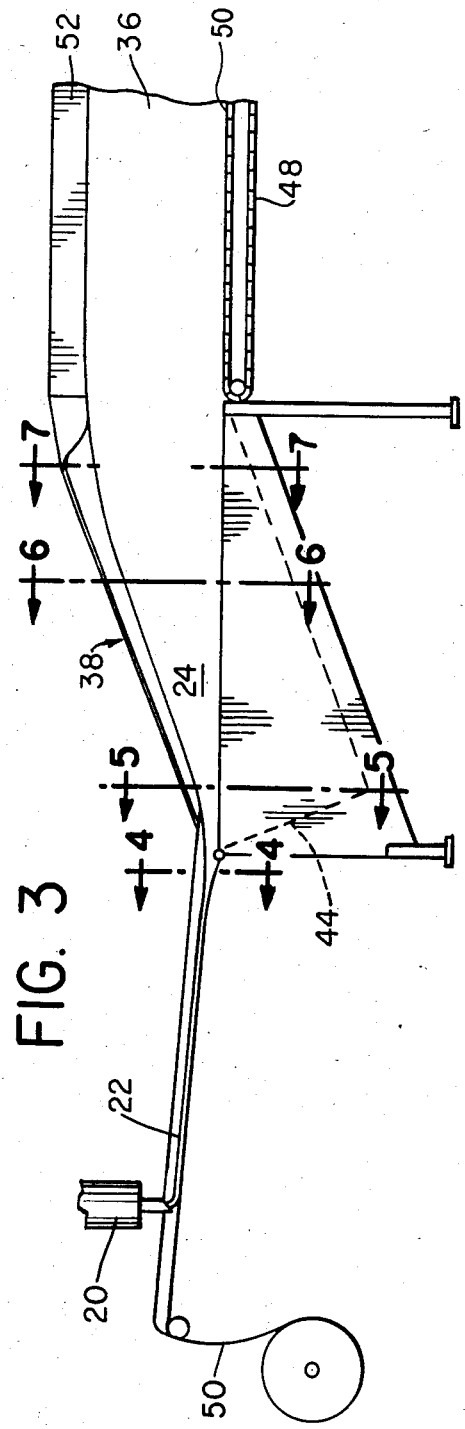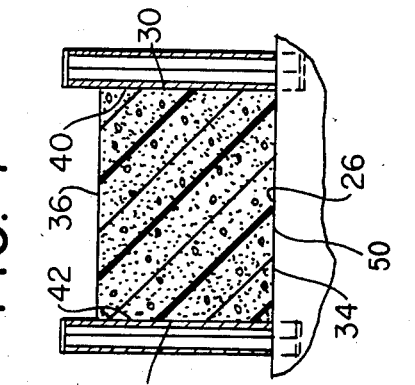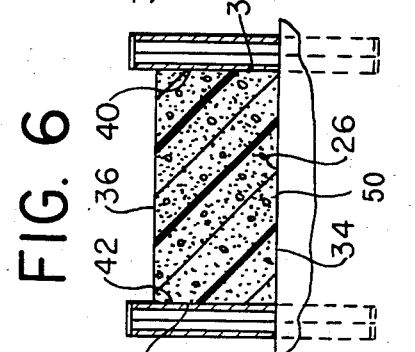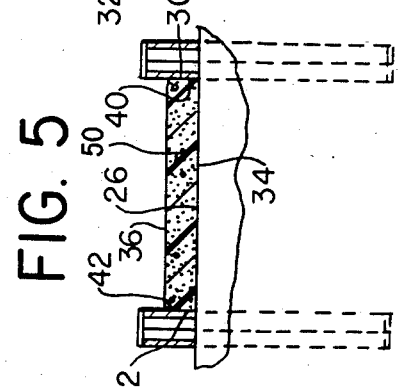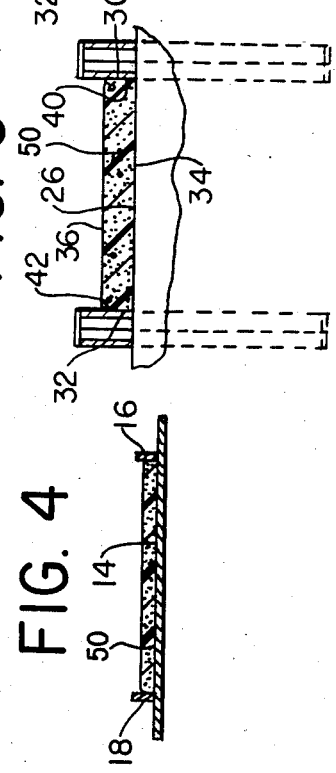

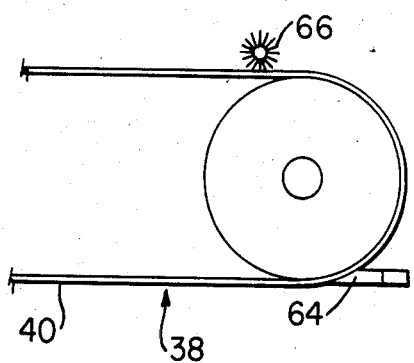
FIG. 10a
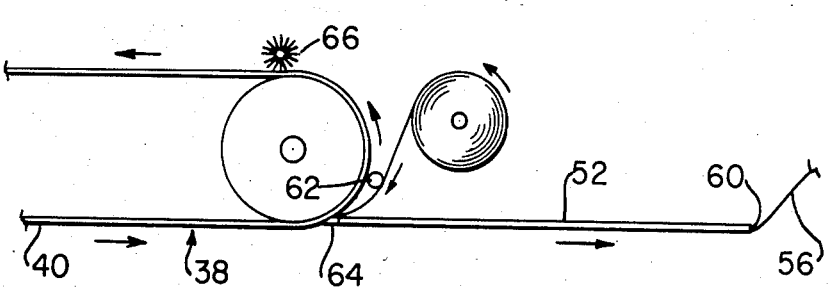
FIG. 10b
FIG. 10c
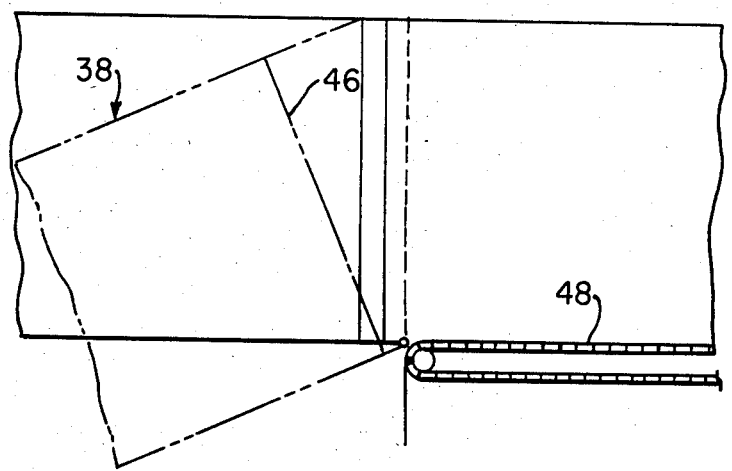

POLYMERIC BUNS AND METHOD AND APPARATUS FOR ITS MANUFACTURE

BACKGROUND OF THE INVENTION

This invention relates to the manufacture of polymeric buns from a liquid polymer which expands upon reaction and, more particularly, to a novel and highly effective method and apparatus for manufacturing flat-topped polyurethane buns, and to buns made by the method or apparatus.

It is conventional practice to manufacture cured polyurethane and similar plastics by dispensing a liquid polymer which expands upon reaction onto a support surface and moving the polymer along a conveyor while the polymer expands to form a long, cured bun. The bun is subsequently sliced or otherwise processed as necessary, depending on the intended use of the plastic.

The buns formed by the conventional techniques tend to have rounded tops, since the plastic expands outwardly in all directions. If the sides of the bun are unsupported or poorly supported, the bun is typically flat on the bottom, and the sides and top merge to form a bun that is generally semicircular in cross section. If the sides of the bun are well supported (as for example with a paper or plastic substrate), the bun is flat on the bottom and sides and has a rounded top.

A patent to Taft, Jr. et al U.S. Pat. No. 3,013,924 discloses dispensing polymeric material such as polyurethane onto a supporting liquid that has a specific gravity greater than that of the polymer so that polymer floats on the liquid. However, the polymer is formed into a thin web rather than a bun. The patent also discloses two parallel movable edge-defining walls for limiting the lateral flow of the polymer across the liquid. However, the walls move in a direction parallel to the surface of the liquid and not in a direction which facilitates expansion of the polymer into a flat-topped bun.

All of the conventional techniques for manufacturing flat top polymeric buns from a polymer which expands upon reaction leave a great deal to be desired. The known techniques for manufacturing a bun which has a bottom, left and right sides and a top all of which are well defined and flat generally require complex machinery of a type not generally found in a typical urethane foaming plant. Moreover, conventional techniques and systems tend to be relatively expensive in practice, in terms both of the equipment required to practice the techniques and of the downtime required to service the equipment. The excessive downtime results largely from the tendency of the polymer to adhere to the parts of the equipment with which it comes in contact, thereby causing a gradual buildup of plastic on the equipment which eventually seriously degrades both the equipment and the manufactured bun. A further drawback of prior art devices for manufacturing flat top buns lays in their inability to foam different types of formulations. Thus, devices that are capable of making flat top buns from polyether foam formulations cannot operate with polyester formulations. These disadvantages are overcome by the present invention as set forth herein.

SUMMARY OF THE INVENTION

An object of the invention is to remedy the shortcomings of conventional methods and apparatus noted above and, in particular, to provide a new method and apparatus for manufacturing polymeric buns from a liquid polymer which expands upon reaction, the new method and apparatus being less expensive and more efficient than the methods and apparatus being less expensive and more efficient than the methods and apparatus heretofore known. Another object of the invention is to provide a polymeric bun, particularly one made of polyurethane, that has a bottom, sides and top all of which are well defined and substantially flat.

The foregoing and other objects are attained in accordance with the invention by forming a support surface into a trough, dispensing liquid polymer which expands on reaction onto the support surface, inclining the support surface to cause flow of the polymer to a region in which the polymer expands, and introducing the polymer onto a supporting liquid which supports the polymer in a zone which is substantially coextensive with at least a major portion of the expansion region. The supporting liquid has a specific gravity higher than that of the polymer, whereby the polymer floats on and advances across the supporting liuid in the form of an expanding mass having left and right sides, a flat bottom and a top which slopes upwardly in the direction of the advance.

Conveying means is brought into supporting relation to the expanding mass at the respective left and right sides of the expanding mass, the conveying means having polymer-supporting active surfaces which respectively lie in substantially vertical planes.

The polymer-supporting active surfaces of the conveying means are advanced at substantially the same speed as the speed of advance of the expanding mass across the supporting liquid, and the conveying means is oriented so that the direction of the advance of the polymer-supporting active surfaces is inclined with respect to the horizontal, the lower ends of the conveying means being upstream of the higher ends thereof.

The conveying means is preferably submerged in the supporting liquid, and a release agent and a solvent are added to the liquid to inhibit adherence of the polymer to the conveying means. The orientation of the conveying means is such that the direction of advance of the polymer-supporting active surfaces is inclined with respect to the horizontal by an angle which does not exceed approximately 60° and is substantially parallel to the sloping top of the polymeric bun as it expands.

Accordingly, upon completion of the expansion, a polymeric bun is formed having bottom, left, right, and top surfaces that are substantially flat.

A protective film is preferably interposed between the polymer and the support surface and advanced with the polymer across and then away from the supporting liquid. A protective film is preferably also interposed between the polymer and side walls provided to facilitate removal of the bun from the expansion region.

BRIEF DESCRIPTION OF THE DRAWING

A better understanding of the invention can be gained from a consideration of the following detailed description of the preferred embodiments thereof, in conjunction with the appended figures of the drawing, wherein:

FIG. 1 is a fragmentary perspective view of a first embodiment of apparatus constructed in accordance with the invention, certain parts of the structure being omitted for clarity;

FIG. 2 is a view partly in elevation and partly in section of a portion of the apparatus of FIG. 1 showing respectively in solid and broken outlines two alternative positions which the apparatus is capable of assuming;

FIG. 3 is a view in side elevation of the apparatus of FIG. 1 showing additional features thereof;

FIGS. 4, 5, 6 and 7 are, respectively, sectional views taken along the lines 4—4, 5—5, 6—6, and 7—7 of FIG. 3 and looking in the directions of the arrows;

FIG. 8b is a side elevational view of the structure of FIG. 8a;

FIG. 10a is a top plan view of a portion of the apparatus showing means inhibiting the adherence of polymer thereto;

FIG. 10b is a top plan view of a portion of the apparatus of FIG. 1 showing the structure of FIG. 10a and also showing means for dispensing a film of plastic between the polymeric bun and supporting side walls;

FIG. 10c is an elevational view showing schematically a portion of the structure of FIG. 2.

DESCRIPTION OF THE PREFERRED EMBODIMENTS

Figure 8A:
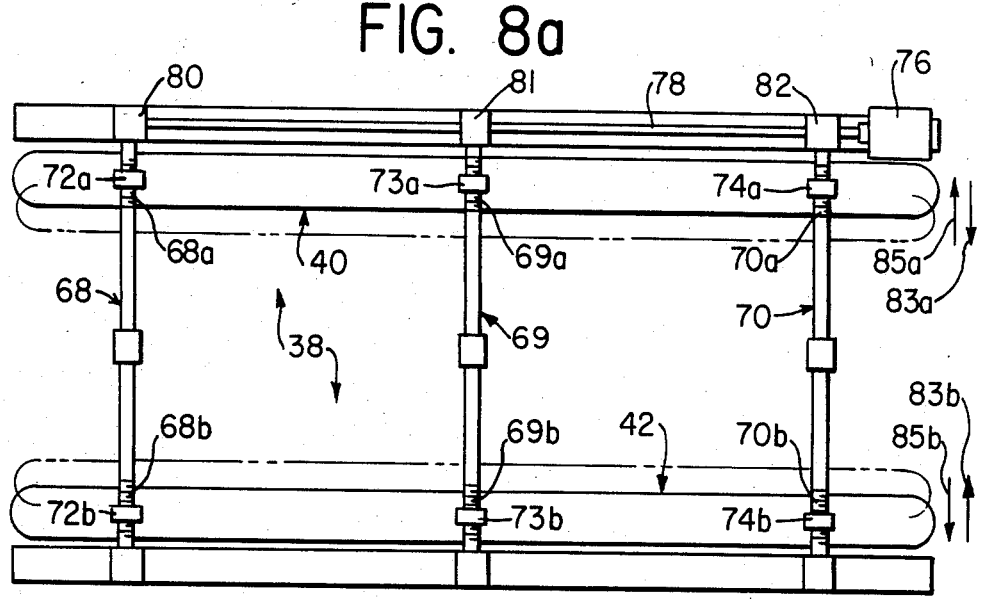
FIG. 8a is a top plan view of a portion of the apparatus of FIG. 1, showing additional fetures thereof facilitating one of the adjustments of which the structure is capable.

FIG. 1 shows apparatus 10 constructed in accordance with the invention for manufacturing a flat-topped polymeric bun 12. A support surface 14 (FIG. 4) is formed into a trough by adding side walls 16, 18. Dispensing means 20 dispenses a liquid polymer 22 which expands on reaction onto the support surface 14.

The support surface 14 is inclined to cause flow of the polymer 12 into a region 24 in which the polymer expands. The polymer is introduced onto a liquid 26 (FIGS. 5-7) which supports the polymer in a zone 28 (FIG. 1) which is substantially coextensive with at least a major portion of the region 24 in which the polymer expands. The supporting liquid 26 has a specific gravity higher than that of the polymer, whereby the polymer floats on and advances across the supporting liquid in the form of an expanding mass having left and rights sides 30 and 32, respectiely (FIGS. 5-7), a flat bottom 34 and a top 36 (FIGS. 1, 3 and 5-7), which slopes upwardly in the direction of advance.

Conveying means 38 (see, for example, FIGS. 1, 2, 8a, 10b and 11) having a continuous or endless loop of interconnected active-surfaces 40 and 42 is brought into supporting relation to the respective left and rights sides 30, 32 of the expanding mass. The conveying means 38 has polymer-supporting active surfaces 40, 42 (see for example FIG. 8a) which respectively lie in substantially vertical planes.

The polymer-supporting active surfaces 40, 42 of the conveying means 38 are advanced at a speed substantially equal to the speed of advance of the expanding mass across the supporting liquid 26.

The conveying means 38 is oriented so that the direction of the advance of polymer-supporting active surfaces 40, 42 is inclined ith respect to the horizontal, the lower ends 44 (FIG. 1) of the conveying means 38 being upstream of the higher ends 46 thereof.

Thus, upon completion of the expansion, a polymeric bun 12 is formed having bottom, left, right and top surfaces 34, 30, 32 and 36, respectively, that are substantially flat, as shown for example in FIG. 7 and in FIG. 1 at the downstream end thereof.

Figure 11:
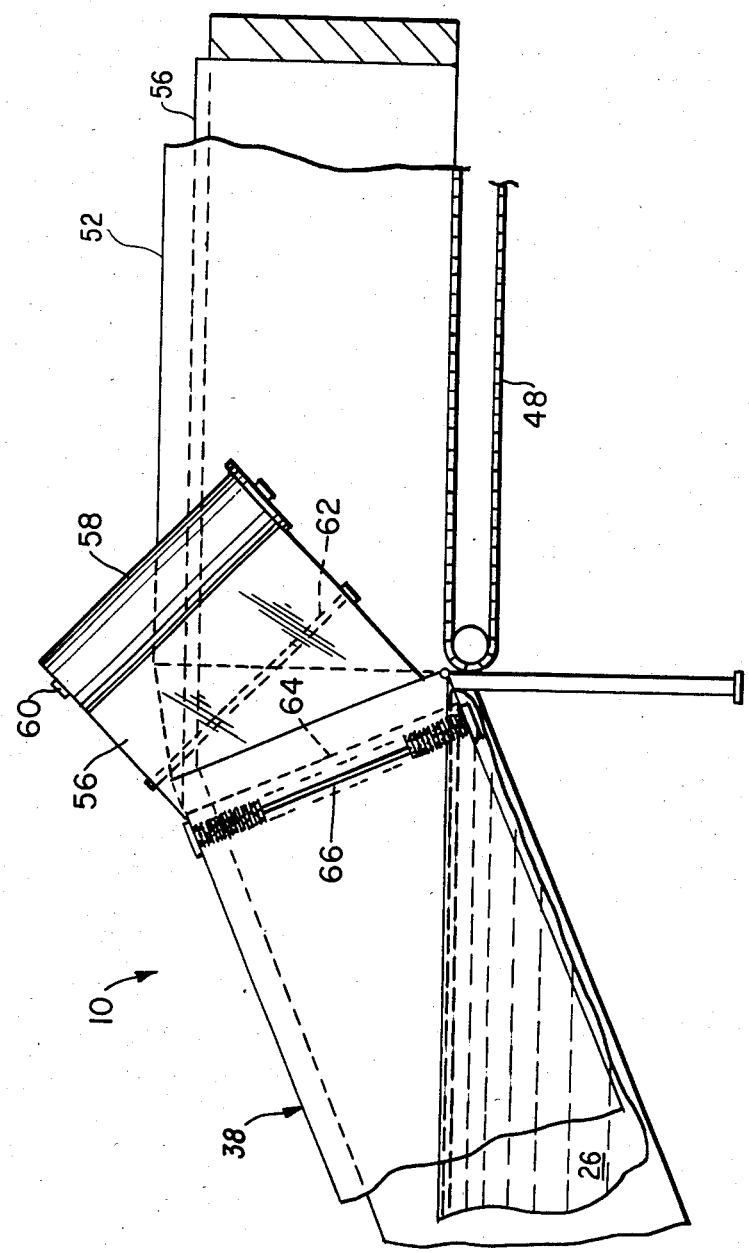
FIG. 11 is an elevational view showing further details of the structure of FIGS. 2 and 10c.

The bun is then conveyed away from the supporting liquid by means of a conveyor 48 (FIGS. 1, 2 and 11).

A protective film 50 (FIGS. 1-3) is preferably interposed between the polymer 22 and the support surface 14 and is advanced with the polymer across and then away from the supporting liquid 26. The film 50 stays with the cured polymer for some distance as it is transported by the conveyor 48, but is removed therefrom by means (not shown) before the polymer is sliced or otherwise processed in a subsequent step (not shown).

Stationary side walls 52, 54 (FIG. 1) are mounted in supporting relation to the bun 12 downstream of the zone 28. A protective film 56 (shown for example in FIG. 10b) is unwound from a roll 58, wound around the lower end 44 of the conveying means 38, run along the active surface 40 (FIG. 8a), and interposed between the bun 12 and the side wall 52. The film 56 advances with the polymer 12 at least to a point 60 at the downstream end of the wall 52. A protective film (not shown) is provided on the other side of the machine, where it is unwound from a roll, wound around the lower end of the conveying means, run along the active surface 42 (FIG. 8a), and similarly interposed between the bun 12 and side wall 54.

In an alternative embodiment of the invention, film 56 is dispensed from roll 58 parallel to and along the outside surface (the side away from the expanding foam mass) of conveying means 38. In this embodiment, roll 58 is disposed at the same angle to the horizontal as conveying means 38.

The film 56 travels parallel to and along with the outside of conveying means 38 and pivots around the end 44 of the conveying means. The film 56 continues to move along with and parallel to the inside face of the conveying means 38. At this point, the film is interposed between the active faces 40 and 42 of conveying means 38 and the rising foam mass and is moving in the same direction as the rising foam along the stationary side walls 52 and 54. At a point 60 at the downstream end of the apparatus, film 60 is wound up on roller 62. Because the film is elastomeric, it is able to stretch slightly to absorb the changes in angular orientation as it moves along the conveying means 38 and along stationary side walls 52 and 54.

In accordance with the invention, the conveying means 38, including both of the conveyors, and specifically the polymer-supporting surfaces 40 and 42 thereof, are submerged in the supporting liquid 26.

FIG. 2 shows two of the many positions which the conveying means 38 is capable of assuming by rotating about a pivot 87 which is substantially at the level of the supporting liquid 26. In the position shown in solid outline, the conveying means 38 is not submerged in the supporting liquid 26 and can easily be cleaned or repaired. FIG. 2 shows in broken outline the upstream end 44 of the conveying means 38 is submersible in the supporting liquid 26 when the apparatus in accordance with the invention is in service. Thus, as the polymer expands it is in contact with the side supports which move in the direction of the expansion. Since the side supports are submerged in the supporting liquid, the distance between the side supports and hence the width of the bun can be easily adjusted as shown, for example, in FIG. 8a and described below.

The roll 58 (FIGS. 1, 10b and 11) is mounted on a spindle 60 which can be parallel to the end 46 of the conveying means 38 as shown in FIG. 2 or can be given the inclination shown in FIG. 11.

In the embodiment of FIG. 1, the protective film 56 must be relatively taut at the top in order to follow a horizontal direction along the side wall 52. The embodiemnt of FIG. 11 is preferred, because the film 56 can, without being creased or stretched, follow in a horizontal direction along the wall 52.

The film 56 passes around a guide 62 shown in FIGS. 10b and 11 which is parallel to the spindle 60 and then around a wiper 64 which is parallel to the edge 46 of the conveyor 38.

In the embodiment of FIG. 11, the angle of inclination of the spindle 60 and guide 62 with respect to the vertical is twice the angle of inclination of the edge of the wiper 64 with respect to the vertical. This causes the polyethylene film 56 to emerge in a horizontal direction after it passes around the edge of the wiper 64 and to follow along the side wall 52 without stretching or wrinkling.

The wiper 64 wipes the expanding polyurethane foam from the conveying means 38.

The polyethylene film 56 prevents polyurethane buildup on the side wall 52 and assists the uninterrupted movement of the polyurethane bun 12.

As the moving side wall conveyors 38 rotate past the wiper 64 and then move downward into the supporting liquid 26, a mild brush 66 (FIGS. 10a, 10b and 11) cleans off any residual film left on the conveyors 38. The conveyor surface continues upstream and downward into the supporting liquid 26 and returns to perform its function again.

In another embodiment of the invention, the protective film 56 is removed from the roll 58 (FIG. 1), wound around the lower end 44 of the conveying means 38, run along the active surface 40 (FIG. 8a), and wound onto a roll (not shown) adjacent to the roll 58. A similar arrangement is provided on the other side of the machine. Additional plastic films are then interposed between the bun 12 and the side walls 52, 54. This provides complete protection in the form of plastic films throughout the process of bun formation while avoiding stretching the film during the transition from sloping to horizontal side walls.

The apparatus of the present invention can be used to make flat top buns of polyether and polyester urethanes. Conventional ester and ether urethane foam forming formulations can be employed in the instant apparatus to form flat top urethane foams with well defined bottom and side walls. One preferred polyester foam formulation that can be used in the invention is:

|  | Parts by Weight |
|---|---|
| WITCO Chemical Co. - FOMREZ 53 (Saturated polyester - adipic acid and polyethylene glycol) | 100 |
| $H_2O$ | 3.5 |
| Silicone surfactant - Union Carbide L532 | 1.5 |
| Tertiary amine catalyst | 0.5 |
| Toluene Diisocyanate | 45 |

A preferred polyether formulation that may be used in the invention is:

| Union Carbide NIAX 1656 (polypropylene glycol polyol) | 100 |
|---|---|
| $H_2O$ | 3.5 |
| Silicone surfactant | 1.0 |
| Stannous Octoate | 0.2 |
| Triethylene Diamine | 0.2 |
| Toluene Diisocyanate | 45 |

A conventional release agent and a conventional solvent are both mixed with the supporting liquid 26 to inhibit the buildup of polyurethane on the conveying means 38. The release agent may be selected from the group consisting of oil based, silicone based, and wax based release agents. The solvent may be selected, from a group consisting of methylene chloride, dimethyl and formamide. The release agent and solvent may be added by connections shown schematically at 65a and 65b, respectively (FIG. 2).

Figure 8B:
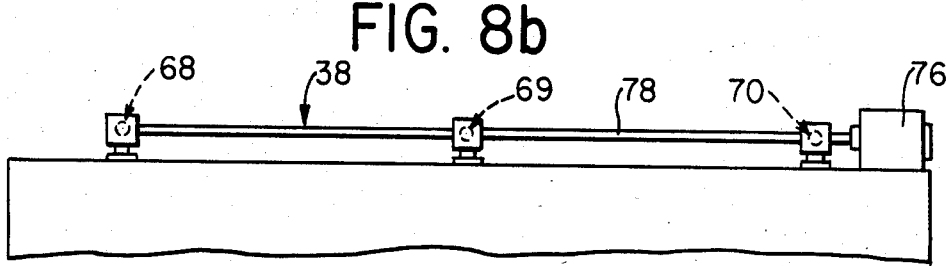

FIGS. 8a and 8b show means for adjusting the spacing between the active surfaces 40 and 42 of the conveying means 38. A plurality of screws 68, 69 and 70, which are spaced apart longitudinally and extend transversely of the apparatus 10, have portions 68a, 69a and 70a threaded in one sense and portions 68b, 69b and 70b threaded in the opposite sense. These portions are threaded through correspondingly threaded supports 72a, 73a and 74a on the one hand and supports 72b, 73b and 74b on the other. These supports are respectively connected to the left and right conveyors of the conveying means 38.

A motor 76 drives a shaft 78 which is connected by bevel gears 80, 81 and 82 (shown schematically) to drive the screws 68, 69 and 70, respectively. Accordingly, when the motor turns in one direction, the screws 68, 69 and 70 all turn in a first direction of rotation, causing the conveyors of the conveying means 38 to move closer together, as indicated by arrows 83a and 83b (FIG. 8a). When the motor 76 turns in the opposite direction, the screws 68, 69 and 70 reverse directions, causing the left and right conveyors of the conveying means 38 to move farther apart from each other, as indicated by the arrows 85a and 85b.

Figure 9:
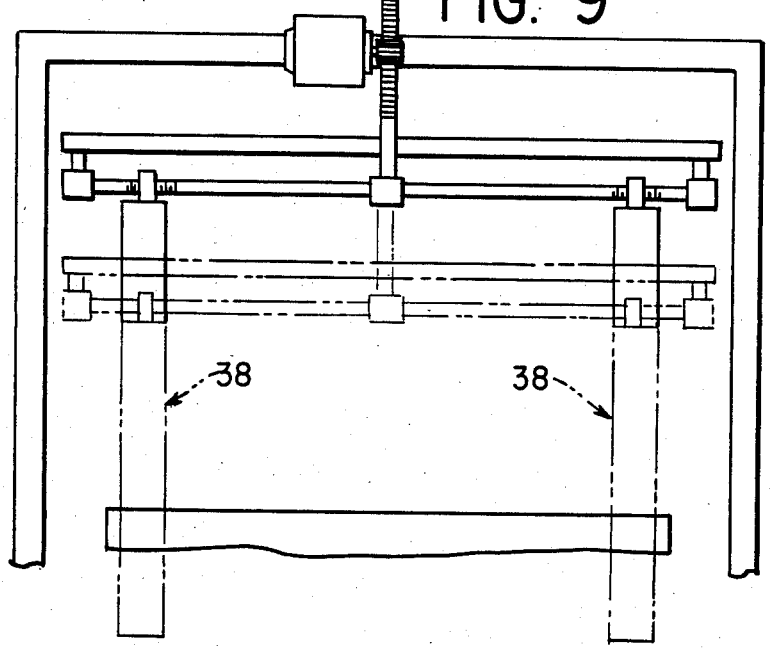
FIG. 9 is an end elevational view of a portion of the apparatus showing means for effecting movement thereof between the two alternative positions shown in FIG. 2.

FIG. 9 shows details of the structure facilitating movement between the positions shown, for example, in solid and broken outlines in FIG. 2. One of the screws, for example, the upstream screw 68, is connected to a rack 90 which meshes with a pinion gear 92 driven by an electric motor 94 which is secured to a rigid frame 96. In order to submerge the conveying means 38 in the supporting liquid 26, motor 94 is caused to rotate in the opposite direction. Clearly, the apparatus of FIG. 9 permits movement not only between the two extreme positions shown in FIG. 2, but also to an intermediate position, whereby the direction of advance of the active supporting surfaces of the conveying means 38 can be made precisely parallel to the direction of movement of the upper surface of the polyurethane bun as it expands in the expansion region 24.

Thus there is provided in accordance with the invention a novel and highly effective method and apparatus for manufacturing polyurethane buns. The buns manufactured by the method and apparatus can be square or rectangular in cross-section and have a bottom, left and right sides, and top which are flat. The buns can thus be sliced to form cushions, mattresses, etc., with minimal waste of material.

Many modifications of the invention disclosed above will readily occur to those skilled in the art. For example, the solvent and release agent employed, the polymer of which the bun is made, the material of which the protective films are made, the liquid used as a means of support during the expansion, and the specific dimensions and angles employed can all be varied within wide limits without departing from the spirit and scope of the invention. Accordingly, the invention is to be construed as including all of the structure and methods falling within the scope of the appended claims.

What is claimed is:

1. A method of manufacturing a flattopped polymeric bun comprising the steps of
    forming a support surface into a trough,
    dispensing liquid polymer which expands on reaction onto said support surface,
    inclining said support surface to cause flow of said polymer to an expansion region in which said polymer expands,
    introducing said polymer onto a supporting liquid which supports said polymer in a zone which is substantially coextensive with at least a major portion of said expansion region, said supporting liquid having a specific gravity higher than that of said polymer, whereby said polymer floats on and advances across said supporting liquid in the form of an expanding mass having left and right sides, a flat bottom and a top which slopes upwardly in the direction of advance,
    bringing conveying means into supporting relation to said expanding mass at said respective left and right sides of said expanding mass, said conveying means having polymer-supporting active surfaces which respectively lie in substantially vertical planes extending in the direction of advance,
    interposing a protective film between said polymer and each of said polymer-supporting active surfaces,
    advancing said polymer-supporting active surfaces of said conveying means to move along with said expanding mass with respect to said supporting liquid, the interposed protective films being thereby advanced therewith, and
    orienting said conveying means so that the direction of advance of said polymer-supporting active surfaces is substantially parallel to said sloping top, the lower ends of said conveying means being submerged in said supporting liquid and being upstream of the higher ends thereof,
    whereby upon completion of said expansion, a polymeric bun is formed having bottom, left, right, and top surfaces that are substantially flat.

2. A method according to claim 1 comprising the further step of conveying said bun away from said supporting liquid.

3. A method according to claim 2 comprising the further step of interposing a further protective film between said polymer and said support surface and advancing said further protective film with said polymer across and then away from said supporting liquid.

4. A method according to claim 1 comprising the further step of bringing side walls into supporting relation on either side of said said polymer downstream of said zone.

5. A method according to claim 4 comprising the further step of interposing each protective film between said polymer and one of said side walls and advancing said protective films with said polymer.

6. A method according to claim 1 comprising the further step of adding a release agent to said liquid to inhibit adherence of said polymer to said conveying means.

7. A method according to claim 6 wherein said release agent is selected from the group consisting of oil based, silicone based, and wax based release agents.

8. A method according to claim 1 comprising the further step of adding a solvent to said liquid to inhibit adherence of said polymer to said conveying means.

9. A method according to claim 7 wherein said solvent is selected from the group consisting of methylene chloride, dimethyl and formamide.

10. A method according to claim 1 comprising the further step of inclining said conveying means so that said direction of advance is inclined with respect to the horizontal by a maximum angle of substantially 60°.

11. A polymeric bun made by the method of claim 1.

12. A polyurethane bun made by the method of claim 1.

13. A method of maufacturing a flat-topped polymeric bun comprising the steps of
    introducing liquid polymer to an expansion region in which said polymer expands and onto a supporting liquid which supports said polymer in a zone which is substantially coextensive with at least a major portion of said expansion region, said supporting liquid having a specific gravity higher than that of said polymer, whereby said polymer floats on and advances across said supporting liquid in the form of an expanding mass having left and right sides, a flat bottom and a top which slopes upwardly in the direction of advance,
    bringing conveying means into supporting relation to said expanding mass at said respective left and right sides of said expanding mass, said conveying mass having polymer-supporting active surfaces which respetively lie in substantially vertical planes extending in the direction of advance,
    interposing a protective film between said polymer and each of said polymer-supporting active surfaces,
    advancing said polymer-supporting active surfaces of said conveying means to move along with said expanding mass with respect to said supporting liquid, the interposed protective films being thereby advanced therewith, and
    orienting said conveying means so that the direction of advance of said polymer-supporting active surfaces is substantially parallel to said sloping top.

14. A method according to claim 13 comprising the further step of conveying said bun away from said supporting liquid.

15. A method according to claim 13 comprising the further step of bringing side walls into supporting relation on either side of said polymer downstream of said zone.

16. A method according to claim 15 comprising the further step of interposing each protective film between said polymer and side walls and advancing said protective film with said polymer.

17. Apparatus for manufacturing a flattopped polymeric bun comprising
    trough means,
    means for dispensing into said trough means liquid polymer which expands on reaction, said through means being inclined to cause flow of said polymer to an expansion region wherein said polymer expands, means providing a supporting liquid for supporting said polymer in a zone which is substantially coextensive with at least a major portion of said expansion region, said supporting liquid having a specific gravity which is higher than that of said polymer, whereby said polymer floats on and advances across said supporting liquid in the form of an expanding mass having left and right sides, a flat bottom and a top which slopes upwardly in the direction of advance, conveying means having relatively firm polymer-supporting active surfaces, means mounting said conveying means in supporting relation to said expanding mass at said respective left and right sides of said expanding mass with said polymer-supporting active surfaces lying in substantially vertical planes extending in the direction of advance, a protective film interposed between said polymer and each of said polymer-supporting active surfaces, and means for advancing said polymer-supporting active surfaces of said conveying means so that they move along with said expanding mass with respect to said supporting liquid, the interposed protective film being thereby advanced therewith, said conveying means being oriented so that the direction of advance of said polymer-supporting active surfaces is substantially parallel to said sloping top, the lower ends of said conveying means being submerged in said supporting liquid and being upstream of the higher ends thereof, whereby, upon completion of said expansion, a polymeric bin is formed having bottom, left, right, and top surfaces that are substantially flat.

18. Apparatus according to claim 17 further comprising means for conveying said bun away from said supporting liquid.

19. Apparatus according to claim 17 further comprising a protective film interposed between said polymer and further said through means and means for advancing said further protective film with said polymer across and then away from said supporting liquid.

20. Apparatus according to claim 15 wherein said further protective film is made of polyethylene.

21. Apparatus according to claim 17 further comprising side walls mounted in supporting relation on either side of said polymer downstream of said zone.

22. Apparatus according to claim 21 further comprising an additional protective film interposed between said polymer and each of said side walls and means for advancing said additional protective films with said polymer.

23. Apparatus according to claim 22 wherein said protective films and said additional protective film are made of polyethylene.

24. Apparatus according to claim 22 further comprising spindle means mounting said additional protective film in the form of a roll, at least one of said side walls having an upstream edge inclined with respect to the vertical by a given angle and said spindle means being inclined in the said direction with respect to the vertical by twice said angle, whereby said protective film unwinds from said roll, passes around said edge, and moves horizontally along said one of said side walls in a horizontal direction without creasing.

25. Apparatus according to claim 24 wherein said edge covered by said additional protective film includes means for wiping said conveying means, thereby inhibiting adherence of said polymer to said conveying means.

26. Apparatus according to claim 17 further comprising brush means mounted in contact with said conveying means and means for rotating said brush means, thereby inhibiting adherence of said polymer to said conveying means.

27. Apparatus according to claim 17 further comprising pivot means mounted substantially at the level of said supporting liquid, said conveying means being supported by said pivot means, whereby said conveying means is pivoted into and out of said supporting liquid.

28. Apparatus according to claim 17 further comprising means for adjusting the separation between said respective polymer-supporting active surfaces, whereby the width of said bun can be adjusted.

29. Apparatus according to claim 17 further comprising means for adding a release agent to said liquid to inhibit adherence of said polymer to said conveying means.

30. Apparatus according to claim 17 further comprising means for adding a solvent to said liquid to inhibit adherence of said polymer to said conveying means.

31. Apparatus for manufacturing a flat-topped polymeric bun comprising:

means for dispensing liquid polymer which expands on reaction, means providing a supporting liquid for supporting said polymer in a zone which is substantially coextensive with at least a major portion of an expansion region wherein said polymer expands, said supporting liquid having a specific gravity which is higher than that of said polymer, whereby said polymer floats on and advances across said supporting liquid in the form of an expanding mass having left and right sides, a flat bottom and a top which slopes upwardly in the direction of advance, conveying means having relatively firm polymer-supporting active surfaces, means mounting said conveying means in supporting relation to said expanding mass at said respective left and right sides of said expanding mass with said polymer-supporting active surfaces lying in substantially vertical planes extending in the direction of advance, a protective film interposed between said polymer and each of said polymer-supporting active surfaces, and means for advancing said polymer-supporting active surfaces of said conveying means so that they move along with said expanding mass with respect to said supporting liquid, the interposed protective film being thereby advanced therewith, said conveying means being oriented so that the direction of advance of said polymer-supporting active surfaces is substantially parallel to said sloping top, whereby, upon completion of said expansion, a polymeric bun is formed having bottom, left, right, and top surfaces that are substantially flat.

32. Apparatus according to claim 31 further comprising means for conveying said bun away from said supporting liquid.

33. Apparatus according to claim 31 further comprising side walls mounted in supporting relation on either side of said polymer downstream of said zone.

34. Apparatus according to claim 33 further comprising an additional protective film interposed between said polymer and each of said side walls and means for advancing said additional protective films with said polymer.

35. Apparatus according to claim 34 further comprising spindle means mounting said additional protective film in the form of a roll, at least one of said side walls having an upstream edge inclined with respect to the vertical by a given angle and said spindle means being inclined in the said direction with repsect to the vertical by twice said angle, whereby said protective film unwinds from said roll, passes around said edge, and moves horizontally along said one of said side walls in a horizontal direction without creasing.

36. Apparatus according to claim 31 further comprising means for submerging the upstream portion of said conveying means in said supporting liquid.

37. Apparatus according to claim 31 further comprising pivot means mounted substantially at the level of said supporting liquid, said conveying means being suppoted by said pivot means, whereby said conveying means is pivoted into and out of said supporting liquid.

38. Apparatus according to claim 36 further comprising means for adjusting the separation between said respective polymer-supporting active surfaces, whereby the width of said bun can be adjusted.

39. Apparatus for manufacturing a polymeric bun comprising:
   means for dispensing liquid polymer which expands on reaction,
   means providing a supporting liquid for supporting said polymer in a zone which is substantially coextensive with at least a major portion of an expansion region wherein said polymer expands, said supporting liquid having a specific gravity which is higher than that of said polymer, whereby said polymer floats on and advances across said supporting liquid in the form of an expanding mass having left and right sides, a flat bottom and a top which slopes upwardly in the direction of advance,
   wall means having relatively firm polymer-supporting active surfaces, and
   means mounting said wall means in supporting relation to said expanding mass at said respective left and right sides of said expanding mass with said polymer-supporting active surfaces lying in substantially vertical planes extending in the direction of advance, said mounting means including means for selectively adjusting the distance between said polymer supporting active surfaces.

* * * * *